(12) United States Patent
Zhang et al.

(10) Patent No.: US 9,431,038 B1
(45) Date of Patent: Aug. 30, 2016

(54) METHOD FOR FABRICATING A MAGNETIC WRITE POLE HAVING AN IMPROVED SIDEWALL ANGLE PROFILE

(71) Applicant: Western Digital (Fremont), LLC, Fremont, CA (US)

(72) Inventors: Jinqiu Zhang, Fremont, CA (US); Xiaoyu Yang, Union City, CA (US); Feng Liu, San Ramon, CA (US); Xiaojun Zhang, Fremont, CA (US); Krishna Chetry, Fremont, CA (US); Masahiro Osugi, Fremont, CA (US); Ning Wu, Fremont, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/753,630

(22) Filed: Jun. 29, 2015

(51) Int. Cl.
| G11B 5/11 | (2006.01) |
| B44C 1/22 | (2006.01) |
| G11B 5/31 | (2006.01) |
| G11B 5/60 | (2006.01) |

(52) U.S. Cl.
CPC ........... *G11B 5/3163* (2013.01); *G11B 5/6082* (2013.01)

(58) Field of Classification Search
None
See application file for complete search history.

(56) References Cited

U.S. PATENT DOCUMENTS

| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |

(Continued)

OTHER PUBLICATIONS

Feng Liu, et al., U.S. Appl. No. 14/051,359, filed Oct. 10, 2013, 26 pages.

*Primary Examiner* — Shamim Ahmed
(74) *Attorney, Agent, or Firm* — Convergent Law Group LLP

(57) ABSTRACT

A method provides a magnetic device having an air-bearing surface (ABS) location. A layer including first and second sublayers is provided. The first sublayer includes the ABS location. The second sublayer recessed from the ABS location such that part of the first sublayer is between the second sublayer and the ABS location. The first sublayer has a rear surface oriented at a nonzero, acute angle from a surface perpendicular to the ABS location. A trench is formed in the layer. The trench has a bottom, a top and sidewalls. The sidewalls form a first angle with a direction perpendicular to the bottom at the ABS location. The sidewalls form a second angle with the direction in part of the second sublayer. The second angle is smaller than the first angle. The sidewall angle varies along the rear surface of the first sublayer. A main pole is provided in the trench.

15 Claims, 15 Drawing Sheets

(56) References Cited

U.S. PATENT DOCUMENTS

| | | |
|---|---|---|
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,675 B1 | 1/2003 | Shukh et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |

(56) References Cited

U.S. PATENT DOCUMENTS

| | | |
|---|---|---|
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,626 B2 | 3/2009 | Ichihara et al. |
| 7,508,627 B1 | 3/2009 | Zhang et al. |
| 7,522,377 B1 | 4/2009 | Jiang et al. |

(56) References Cited

U.S. PATENT DOCUMENTS

| | | |
|---|---|---|
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,663,839 B2 | 2/2010 | Sasaki et al. |
| 7,672,079 B2 | 3/2010 | Li et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,748,104 B2 | 7/2010 | Bonhote et al. |
| 7,785,666 B1 | 8/2010 | Sun et al. |
| 7,796,356 B1 | 9/2010 | Fowler et al. |
| 7,796,361 B2 | 9/2010 | Sasaki et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,027,125 B2 | 9/2011 | Lee et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,732 B2 | 2/2012 | Bai et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,347,488 B2 | 1/2013 | Hong et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |

(56) References Cited

U.S. PATENT DOCUMENTS

| | | |
|---|---|---|
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 * | 10/2013 | Zhang .................. G11B 5/1278 428/800 |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,988,825 B1 * | 3/2015 | Zhang .................. G11B 5/3116 360/125.3 |
| 9,280,990 B1 * | 3/2016 | Zhang .................. G11B 5/3163 |
| 9,305,583 B1 * | 4/2016 | Zhang .................. G11B 5/855 |
| 2003/0076630 A1 | 4/2003 | Sato et al. |
| 2004/0184191 A1 | 9/2004 | Ichihara et al. |
| 2005/0117251 A1 | 6/2005 | Matono et al. |
| 2008/0002309 A1 | 1/2008 | Hsu et al. |
| 2009/0279206 A1 | 11/2009 | Yang et al. |
| 2010/0112486 A1 * | 5/2010 | Zhang .................. G11B 5/1278 430/314 |
| 2010/0146773 A1 | 6/2010 | Li et al. |
| 2010/0290157 A1 | 11/2010 | Zhang et al. |
| 2011/0051293 A1 | 3/2011 | Bai et al. |
| 2011/0086240 A1 | 4/2011 | Xiang et al. |
| 2011/0222188 A1 | 9/2011 | Etoh et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0268845 A1 | 10/2012 | Sahoo et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

* cited by examiner

Prior Art
ABS View

Side View

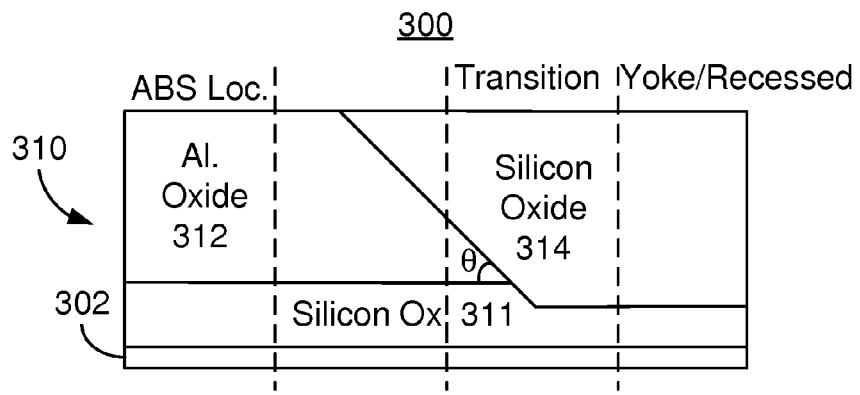
FIG. 11A
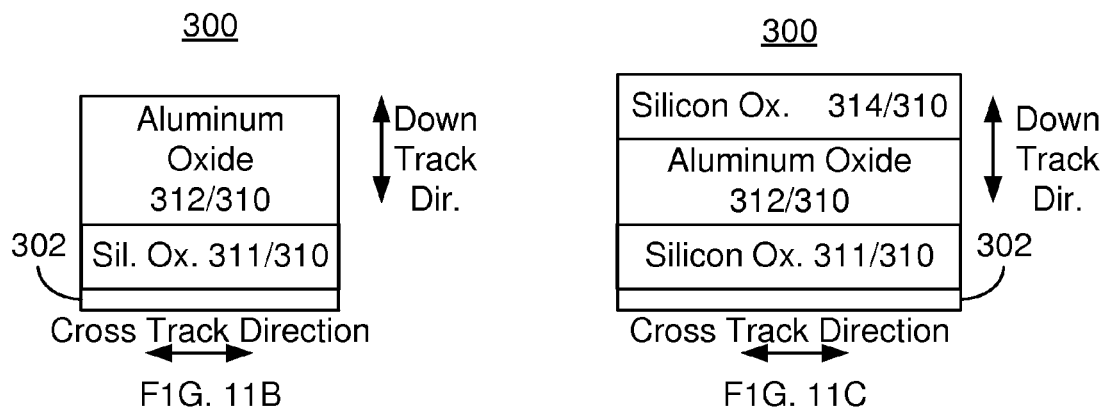
FIG. 11B
FIG. 11C
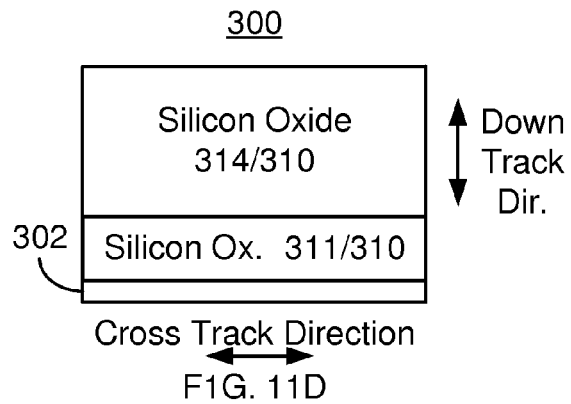
FIG. 11D

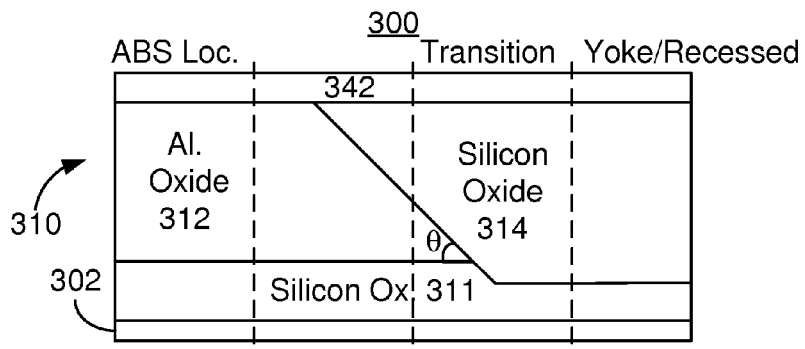
FIG. 13A
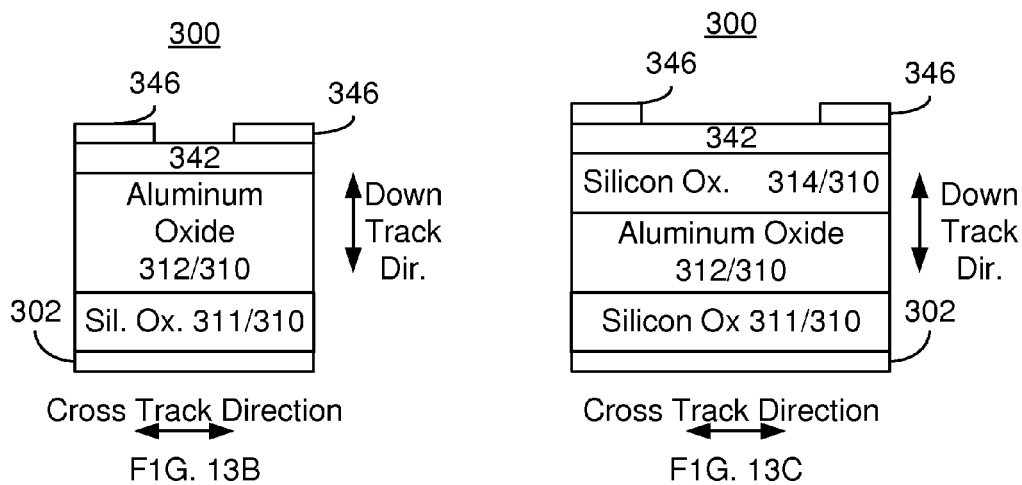
FIG. 13B
FIG. 13C
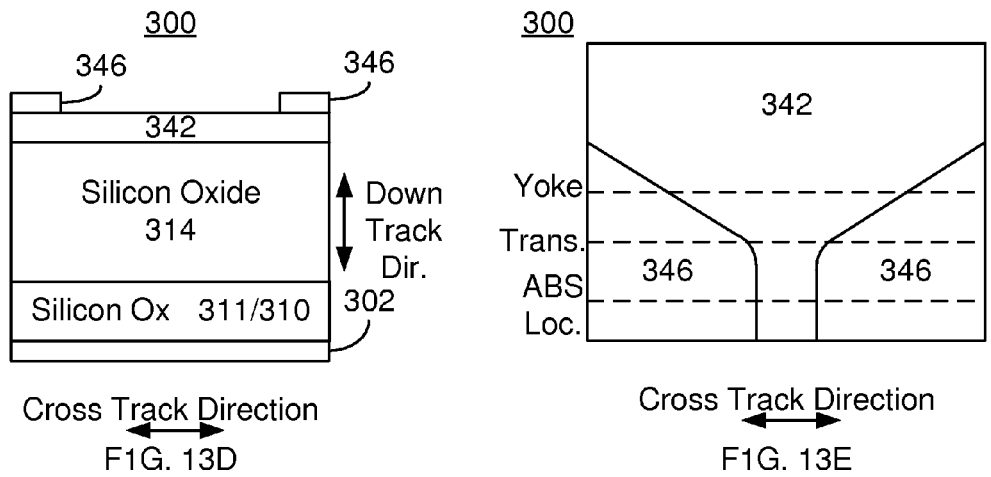
FIG. 13D
FIG. 13E

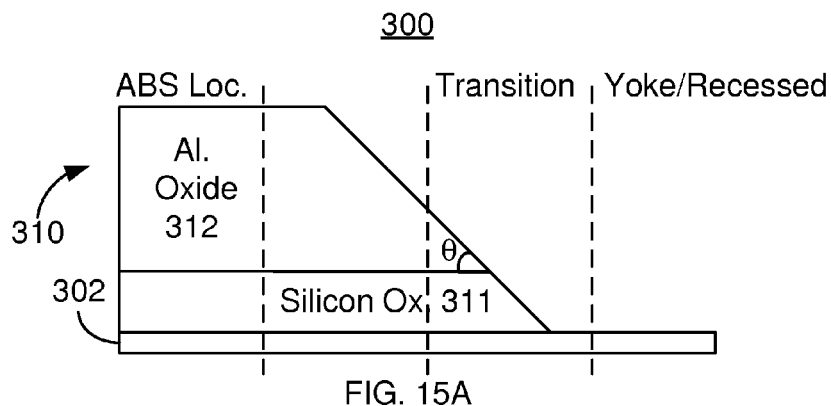
FIG. 15A
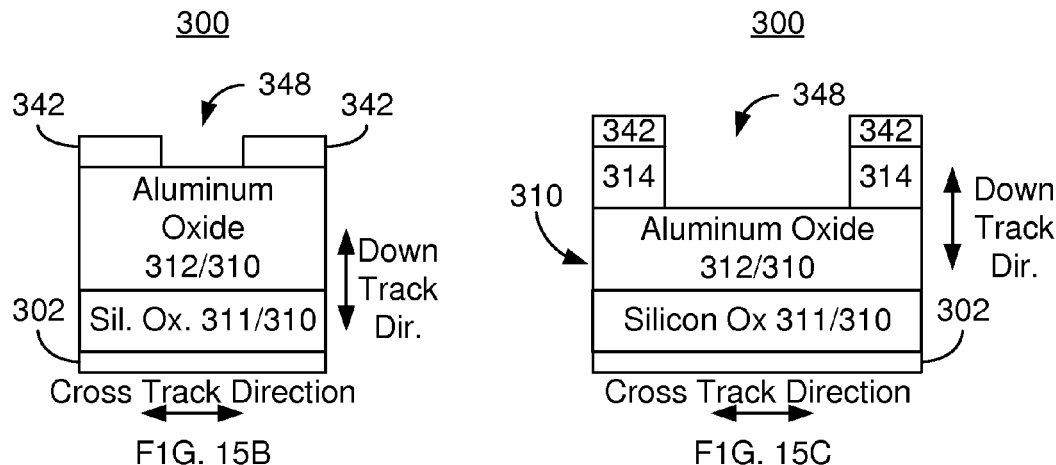
FIG. 15B
FIG. 15C
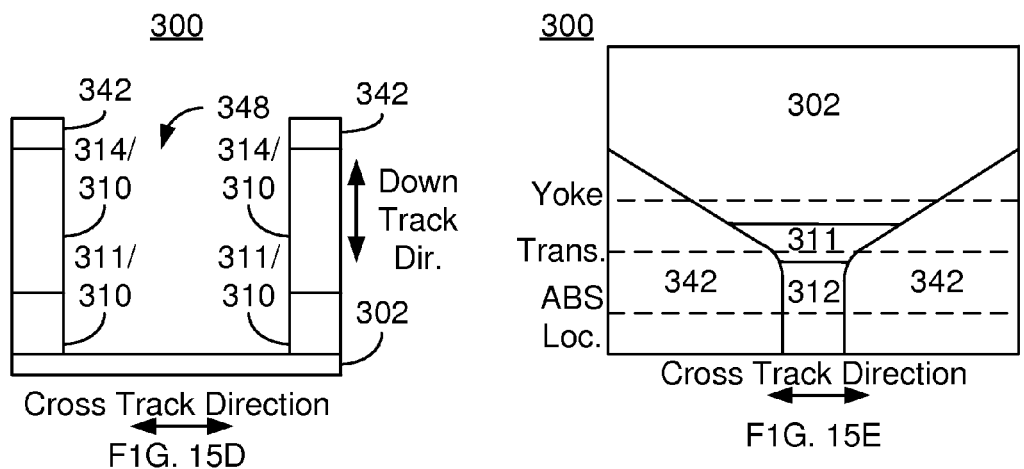
FIG. 15D
FIG. 15E

METHOD FOR FABRICATING A MAGNETIC WRITE POLE HAVING AN IMPROVED SIDEWALL ANGLE PROFILE

BACKGROUND

FIGS. 1A, 1B and 1C depict ABS, yoke and side views of a conventional magnetic recording head 10. The conventional magnetic recording transducer 10 may be a part of a merged head including the write transducer 10 and a read transducer (not shown). Alternatively, the magnetic recording head may be a write head including only the write transducer 10. Although termed a yoke view, the view shown in FIG. 1B is taken along the surface parallel to the ABS a distance x1 from the ABS. This surface is depicted as a dotted line in FIG. 1C.

The main pole 20 resides on an underlayer 12 and includes sidewalls 22 and 24. The sidewalls 22 and 24 of the conventional main pole 20 form an angle $\alpha 0$ with the down track direction at the ABS and an angle $\alpha 1$ with the down track direction at the distance x1 from the ABS. As can be seen in FIGS. 1A and 1B, portions of the main pole 20 recessed from the ABS in the stripe height direction are wider in the cross track direction than at the ABS. In addition, the angle between the sidewalls 22 and 24 and the down track direction increases. Thus, $\alpha 1$ is greater than $\alpha 0$. For example, if $\alpha 0$ is on the order of 13°, then $\alpha 1$ may be 25°.

Although the conventional magnetic recording head 10 functions, there are drawbacks. In particular, the conventional magnetic recording head 10 may not perform sufficiently at higher recording densities. For example, the write field of the conventional main pole 20 may not have a sufficiently high magnitude write field to meet particular standards. Accordingly, what is needed is a method for improving the performance of a magnetic recording head.

DETAILED DESCRIPTION OF THE PREFERRED EMBODIMENTS

Figure 1A:
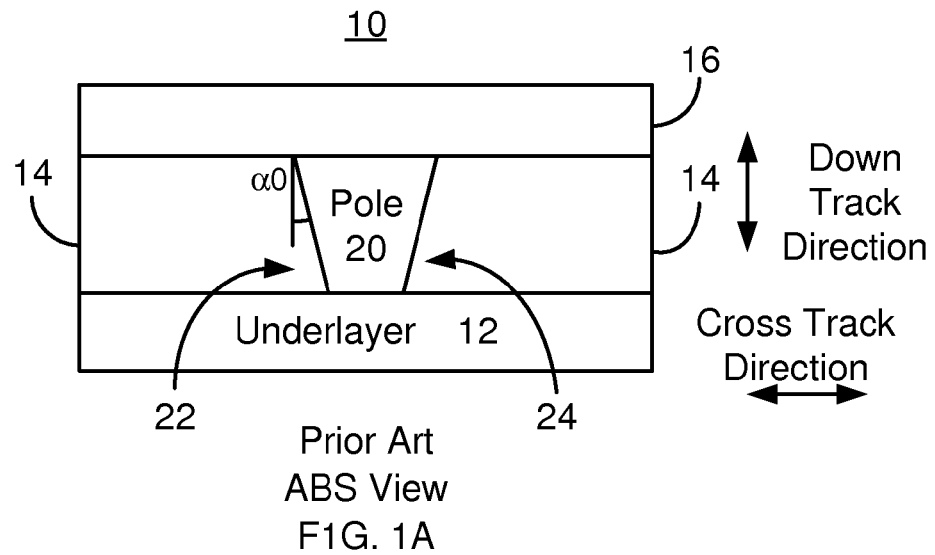
FIGS. 1A-1C depict ABS, yoke and side view of a conventional magnetic recording head.
Figure 1B:
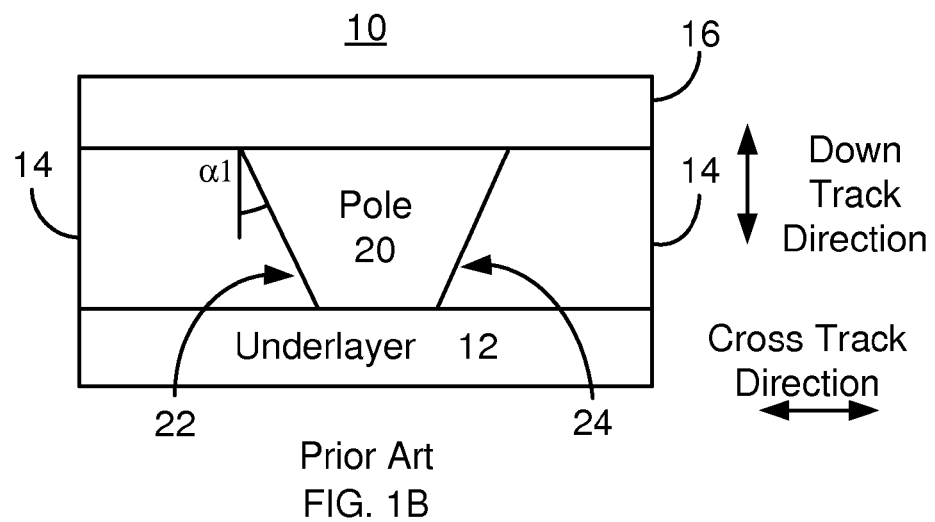
Figure 1C:
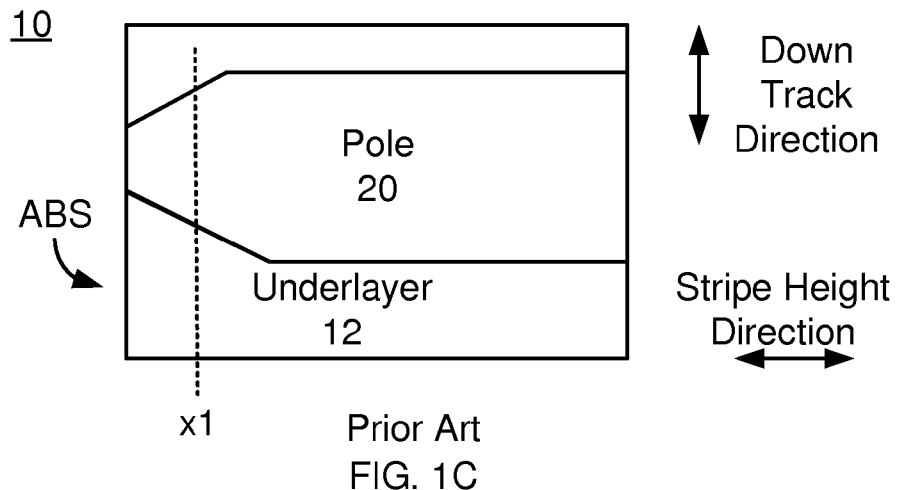
Figure 2:
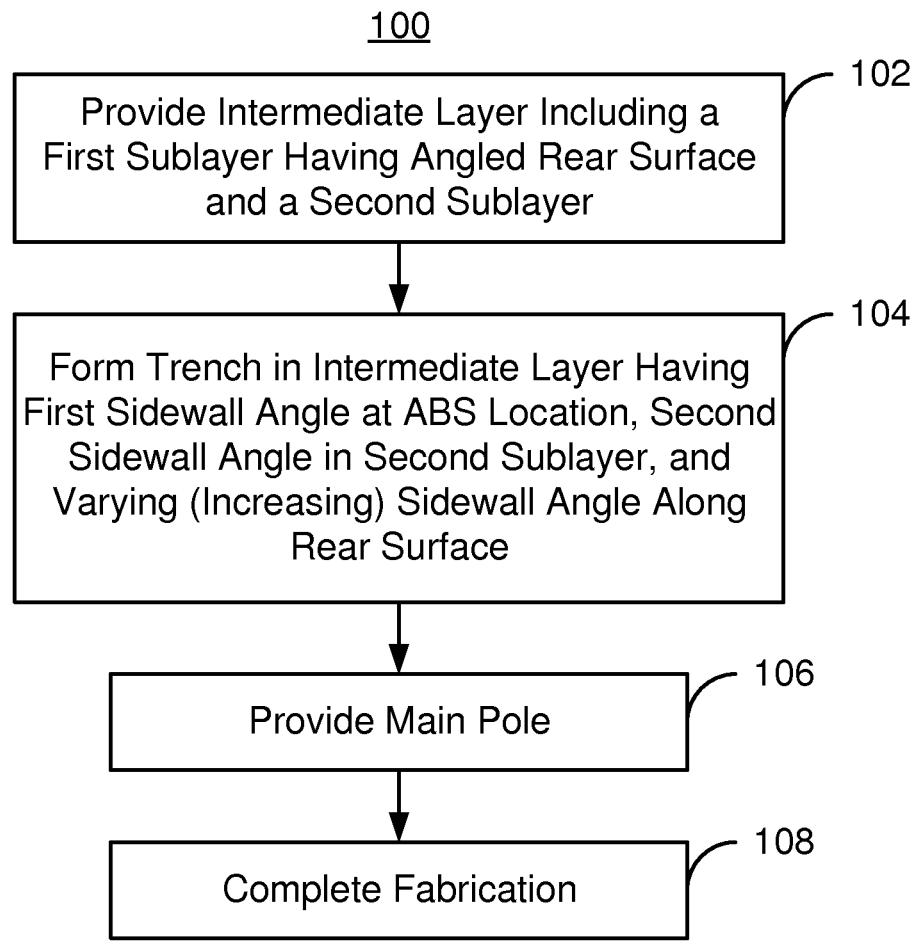
FIG. 2 is a flow chart depicting an exemplary embodiment of a method for providing a magnetic recording apparatus.

FIG. 2 depicts an exemplary embodiment of a method 100 for providing a magnetic recording apparatus. For simplicity, some steps may be omitted, interleaved, combined, have multiple substeps and/or performed in another order unless otherwise specified. FIGS. 3 through 5A-5C depict an exemplary embodiment of a magnetic recording apparatus 200 during fabrication using the method 100. Referring to FIGS. 2-5C, the method 100 is described in the context of providing a magnetic recording disk drive and transducer 200. The method 100 may be used to fabricate multiple magnetic recording heads at substantially the same time. The method 100 may also be used to fabricate other magnetic recording devices. The method 100 is also described in the context of particular layers. A particular layer may include multiple materials and/or multiple sub-layers. The method 100 also may start after formation of other portions of the magnetic recording transducer. For example, the method 100 may start after a read transducer and/or other structures have been fabricated. For example, the method 100 may start after the underlying structures, including an underlayer, have been provided. For example, the underlayer may include a leading shield, a seed layer an etch stop layer and/or additional etchable layer(s).

An intermediate layer is provided on the underlayer or substrate, via step 102. The substrate/underlayer may be considered to include the structures fabricated prior to the pole. In some embodiments, the underlayer may include an etchable layer, such as silicon oxide, that is on an etch stop layer. A metallic layer may also be provided under the etch stop layer. The intermediate layer provided in step 102 is also an etchable layer. For example, the intermediate layer may be removed by reactive ion etches (RIEs) having the appropriate chemistries. The intermediate layer also includes at least two sublayers at least in the region in which the main pole is to be formed. The first sublayer includes the ABS location. The ABS location is the surface at which the ABS will be located after fabrication of the magnetic device is completed. The second sublayer is recessed from the ABS location such that a portion of the first sublayer is between the second sublayer and the ABS location. The first and second sublayers are both etchable and may be nonmagnetic. However, different etch chemistries may be used to etch the sublayers. The first sublayer has a rear surface oriented at an angle of greater than zero degrees and less than ninety degrees from a surface perpendicular to the ABS location. Step 102 may include full-film depositing the material(s) for the first sublayer. A portion of the layer formed by these material(s) is removed such that the angle of the rear surface is formed. The region behind the first sublayer may then be refilled using the material(s) for the second sublayer.

Figure 3:
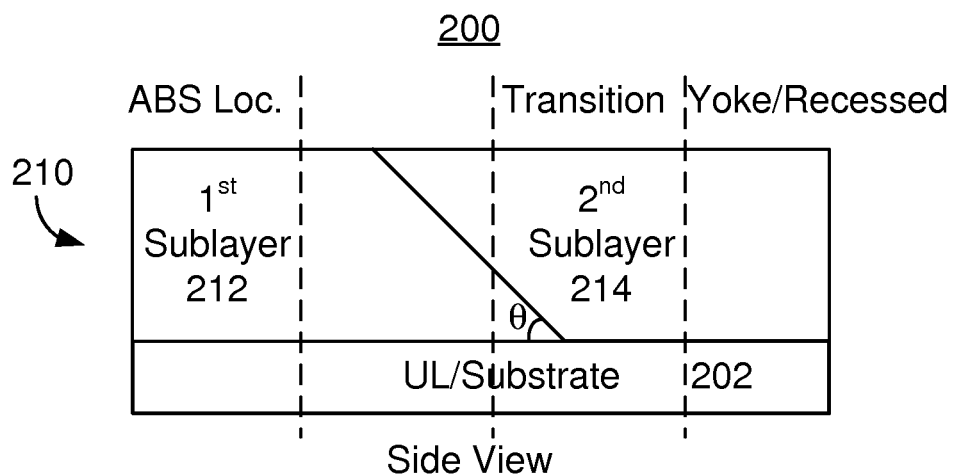
FIG. 3 depicts a side view of a magnetic recording apparatus during fabrication using the method.

FIG. 3 depicts an apex view of the transducer 200 after step 102 is performed. Thus, the intermediate layer 210 is formed on the underlayer 202. The underlayer 202 may include an etch stop layer, an etchable layer and/or other structures. The intermediate layer 210 includes a first sublayer 212 and a second sublayer 214. The sublayers 212 and 214 are etchable. However, one sublayer 212/214 may act as a stop layer for the other sublayer 214/212 given the proper etch chemistry. For example, the first sublayer 212 may be aluminum oxide while the second sublayer 214 may be silicon oxide. The rear surface of the first sublayer 212 forms an angle, $\theta$, with a surface perpendicular to the ABS location. In this embodiment, the angle $\theta$ is between the bottom of the first sublayer 212 and the rear surface of the sublayer 212. The angle, $\theta$, is greater than zero degrees and less than ninety degrees. Thus, the rear surface of the first sublayer 212 is neither parallel to nor perpendicular to the ABS location. For example, in some embodiments, the angle, $\theta$, is at least fifty degrees and not more than eighty degrees. In some such embodiments, this angle is at least sixty degrees and not more than seventy degrees. The ABS location, a transition region including the rear surface of the first sublayer 212 and a yoke region which is within the second sublayer 214 are also indicated in FIG. 3 by dashed lines.

A trench is formed in the intermediate layer, via step 104. In some embodiments, step 102 includes performing multiple RIEs. The trench corresponds to a main pole. Step 104 may include forming a mask that has an aperture therein. The apertures has a shape (footprint) and location corresponding to the trench. Multiple etches are performed with the mask in place. A first etch removes a portion of the second sublayer, recessed from the ABS location. A second etch removes at least a portion of the first sublayer, including a portion at the ABS location. In some embodiments, the first etch is performed before the second etch. In alternate embodiments, the second etch is performed before the first etch.

Figure 4A:
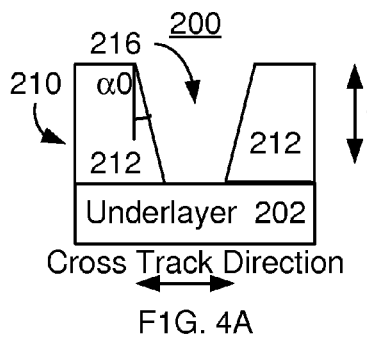
FIGS. 4A-4C depict ABS, recessed and yoke views of a magnetic recording apparatus during fabrication using the method.
Figure 4B:
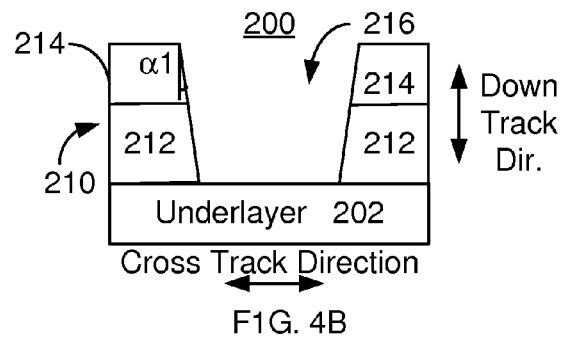
Figure 4C:
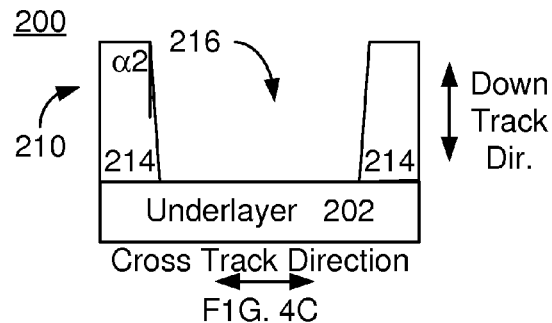

FIGS. 4A-4C depict ABS location, recessed/transition and yoke views of the magnetic recording apparatus 200 after step 104 has been performed. The views in FIGS. 4A, 4B and 4C are thus taken at the dashed lines in FIG. 3. A trench 216 has been formed in the intermediate layer 210. The sidewalls of the trench form a sidewall angle with a direction perpendicular to the bottom of the trench. The sidewall angle has value $\alpha 0$ at the ABS location (FIG. 4A), $\alpha 1$ at a transition location in the rear surface of the first sublayer 212 (FIG. 4B) and a value $\alpha 2$ in the yoke region (FIG. 4C). Thus, the sidewall angle decreases in the yoke direction perpendicular to the ABS location. Thus, the angle $\alpha 2$ in the yoke region is smaller than the angle $\alpha 0$ at the ABS location. The angle $\alpha 0$ is at least ten degrees and not more than twenty degrees in some embodiments. The angle $\alpha 2$ may be at least zero degrees and not more than five degrees. In some embodiments, $\alpha 2$ is not more than three degrees. The angle $\alpha 1$ is between $\alpha 0$ and $\alpha 2$. In other words, $\alpha 0 > \alpha 1 > \alpha 2$. In some embodiments, the sidewall angle decreases smoothly along the rear surface of the first sublayer 212. For example, the sidewall angle $\alpha 2$ may decrease linearly along the rear surface, in accordance with the square of the distance from the ABS location, or in another manner.

A main pole is provided in the trench, via step 106. In some embodiments, step 106 may include electroplating one or more layers. Other deposition methods may be used in addition to or in lieu of plating. The pole material(s) may also be planarized. The main pole material(s) have a high saturation magnetization and thus may include material(s) such as CoFe. Step 106 may also include depositing a seed layer and forming leading and/or trailing bevels.

Figure 5A:
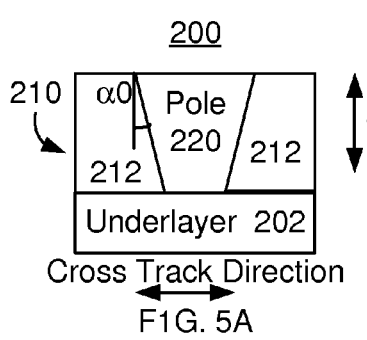
FIGS. 5A-5C depict ABS, recessed and yoke views of a magnetic recording apparatus during fabrication using the method.
Figure 5B:
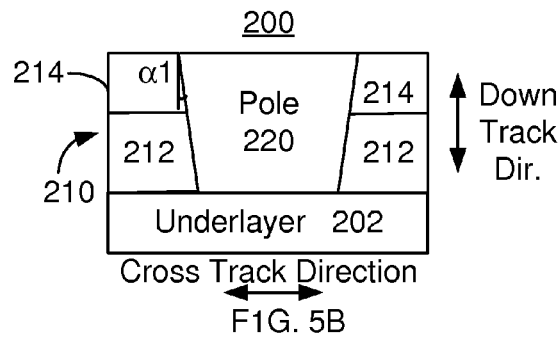
Figure 5C:
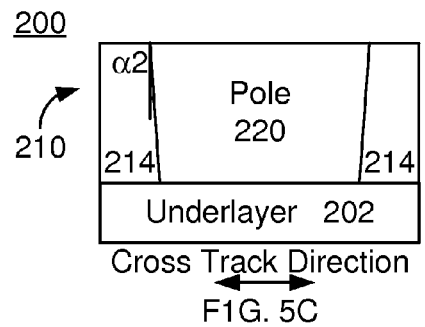

FIGS. 5A-5C depict ABS location, recessed/transition and yoke views of the magnetic recording apparatus 200 after step 106 has been performed. The views in FIGS. 5A, 5B and 5C are thus taken at the dashed lines in FIG. 3. The pole 220 has been formed. In the regions shown, the main pole 220 has a profile that matches that of the sidewalls of the trench 216. Thus, the pole sidewalls form sidewall angles with a direction perpendicular to the bottom of the pole 220. The sidewall angle has value $\alpha 0$ at the ABS location (FIG. 5A), $\alpha 1$ at a transition location in the rear surface of the first sublayer 212 (FIG. 5B) and a value $\alpha 2$ in the yoke region (FIG. 5C). Thus, the sidewall angle decreases in the yoke direction perpendicular to the ABS location. Thus, the angle $\alpha 2$ in the yoke region is smaller than the angle $\alpha 0$ at the ABS location. The angle $\alpha 0$ is at least ten degrees and not more than twenty degrees in some embodiments. The angle $\alpha 2$ may be at least zero degrees and not more than five degrees. The angle $\alpha 1$ is between $\alpha 0$ and $\alpha 2$. In some embodiments, the sidewall angle decreases smoothly along the rear surface of the first sublayer 212. For example, the sidewall angle may increase linearly along the rear surface, in accordance with the square of the distance from the ABS location, or in another manner.

Fabrication of the transducer may then be completed, via step 108. For example, a write gap, a trailing shield and/or at least one side shield may be provided. In addition, the slider may be lapped and the device otherwise completed.

Using the method 100, a magnetic apparatus 200 having improved performance may be fabricated. The magnetic transducer 200 may exhibit improved performance. Because of the variation in the sidewall angle, the magnetic field generated by the main pole 220 and used to write to the media may be enhanced. The reverse overwrite gain may also be improved. The gradient in the magnetic field may also be improved while maintaining substantially the same side fields. As a result, adjacent track interference may not be adversely affected. Further, the pole tip region of the main pole 220 may have an increased magnetic volume. As a result, the cross track magnetic anisotropy may be improved and domain lockup issues mitigated. Thus, performance of the magnetic writer 200 may be improved. Thus, using the method 100 a pole having the desired performance may be fabricated.

Figure 6:
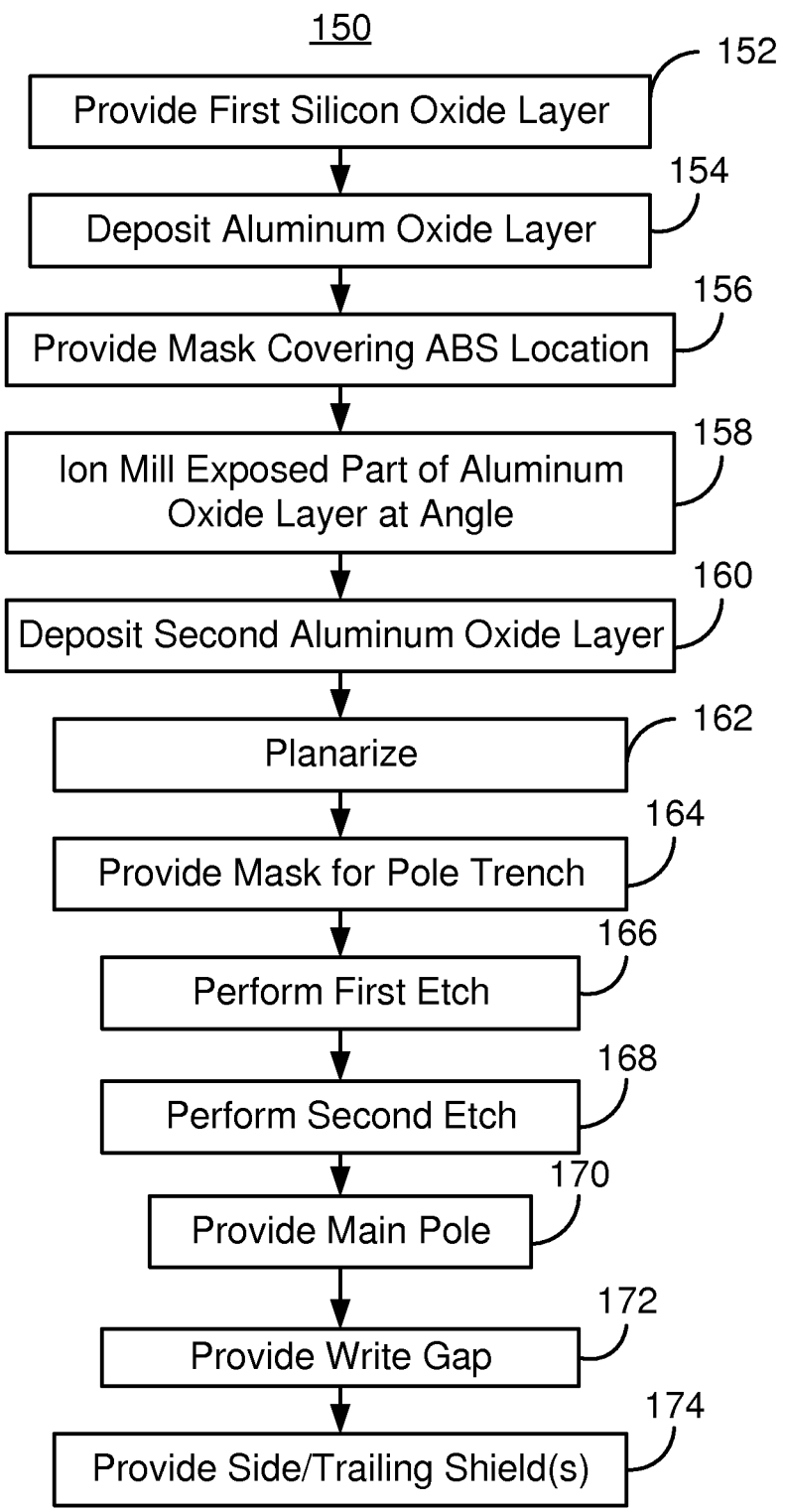
FIG. 6 depicts another exemplary embodiment of a method for providing a magnetic recording transducer.

FIG. 6 depicts an exemplary embodiment of a method 150 for providing a magnetic recording transducer having a varying sidewall angle. For simplicity, some steps may be omitted, interleaved, performed in another order and/or combined. FIGS. 7A-7D though FIGS. 17A-17D depict an exemplary embodiment of a magnetic transducer 250 during fabrication using the method 150. Referring to FIGS. 6-17D, the method 150 may be used to fabricate multiple magnetic recording heads at substantially the same time. The method 150 may also be used to fabricate other magnetic recording transducers. The method 150 is also described in the context of particular layers. A particular layer may include multiple materials and/or multiple sub-layers. The method 150 also may start after formation of other portions of the magnetic recording transducer. For example, the method 150 may start after a read transducer, return pole/shield and/or other structure have been fabricated.

Figure 7A:
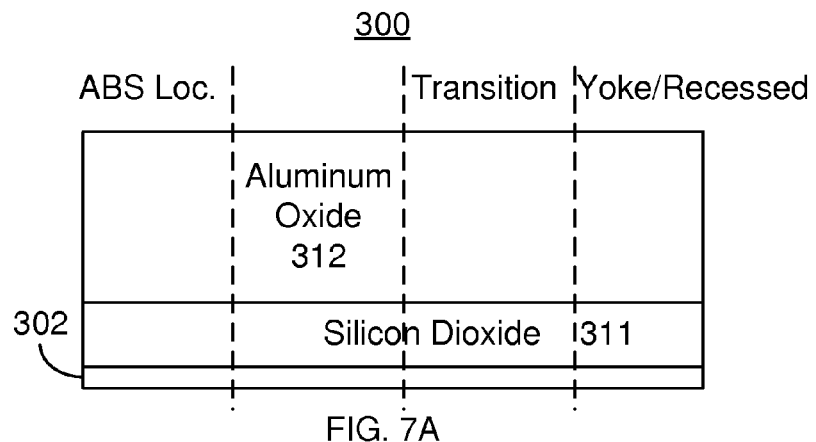
FIGS. 7A-7D through 17A-17D depict various views of a magnetic recording apparatus during fabrication using the method
Figures 7B, 7C:
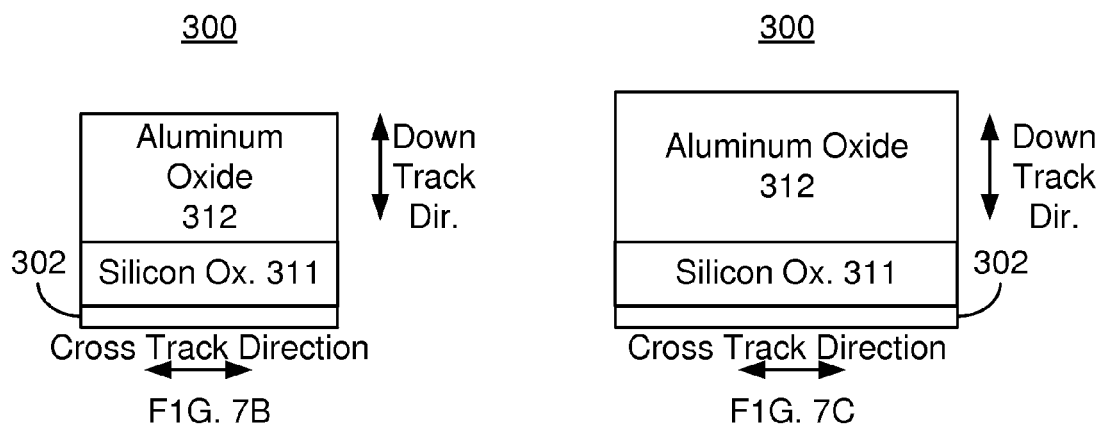
Figure 7D:
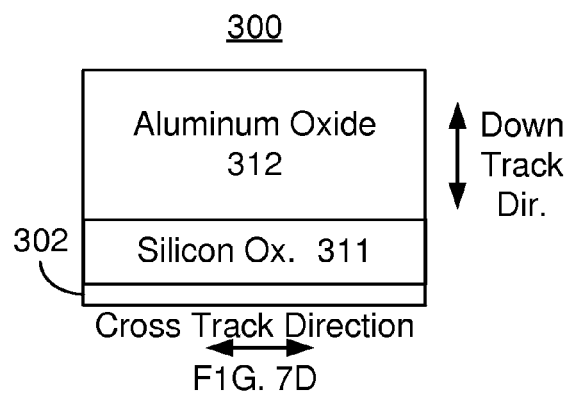
Figure 8A:
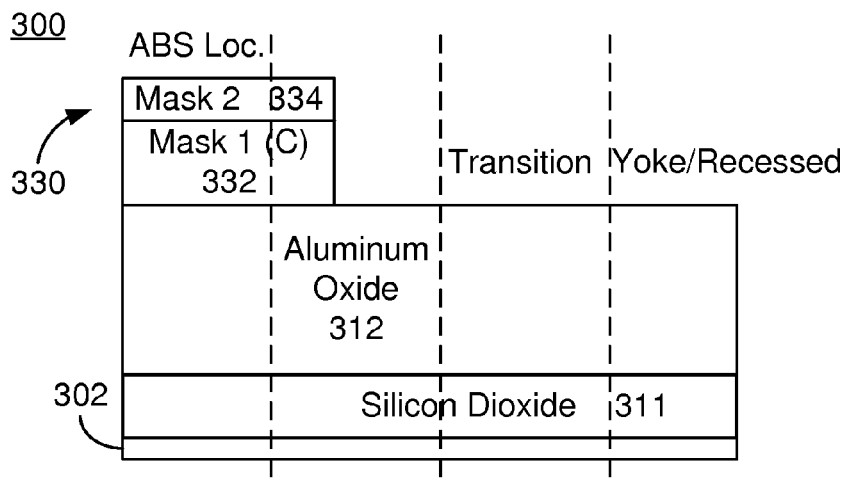
Figure 8B:
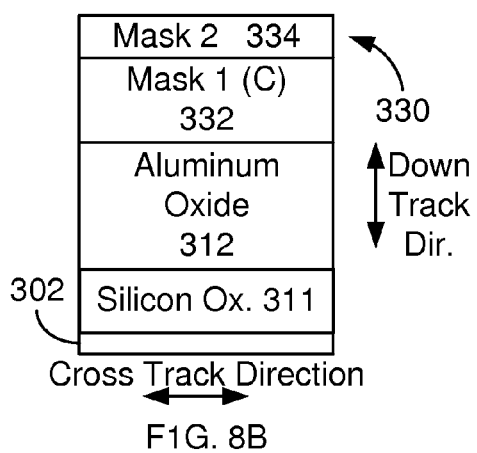
Figure 8C:
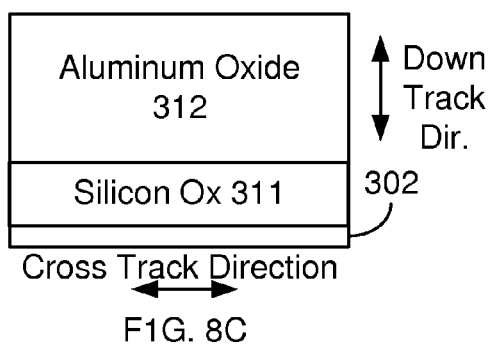
Figure 8D:
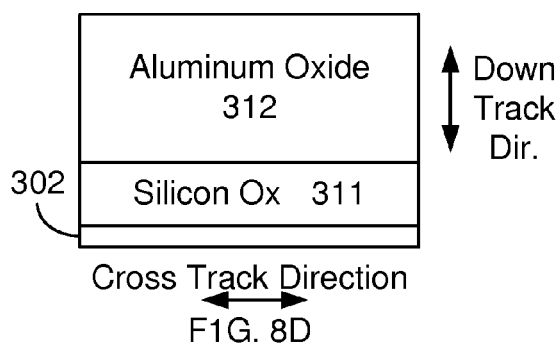

A first silicon oxide layer is provided, via step 152. The silicon oxide layer may be formed on an etch stop layer, such as an aluminum oxide layer. The etch stop layer may be formed on a metal layer such as Ru or NiFe. An aluminum oxide layer is deposited on the silicon oxide layer, via step 154. FIGS. 7A, 7B, 7C and 7D depict apex, ABS location, transition and yoke views of the magnetic recording transducer 300 after step 154 is performed. Thus, FIGS. 7B-7D depict the surfaces at the dashed lines shown in FIG. 7A. Thus, the silicon dioxide layer 311 on the etch stop layer 302 is shown. In some embodiments, the first silicon oxide layer 311 has a thickness of at least sixty and not more than eighty nanometers. The etch stop layer 302 may be aluminum oxide and may be nominally twenty nanometers thick. The aluminum oxide layer 312 resides on the silicon oxide layer 311. In some embodiments, the aluminum oxide layer 312 is at least two hundred and forty and not more than two hundred and sixty nanometers thick. However, other thicknesses for the layers 302, 311 and 312 are possible.

A mask is provided, via step 156. The mask used in step 156 is a hard mask utilized for ion milling. Thus, the mask covers the ABS location as well as a portion of the aluminum oxide layer recessed from the ABS. FIGS. 8A, 8B, 8C and 8D depict apex, ABS location, transition and yoke views of the magnetic recording transducer 300 after step 156 is performed. Thus, the mask 330 is shown. In the embodiment shown, the mask 330 is a dual layer hard mask. Thus, the mask 330 includes a bottom layer 332 and a top layer 334. The bottom layer 332 may be formed of amorphous carbon. The top layer 334 may be formed of Ta.

An ion mill or other process for removing an exposed portion of the aluminum oxide layer 312 is performed, via step 158. The ion mill is performed at a nonzero angle from the ABS location. For example, the ion mill may be performed at an angle of fifty through eighty degrees from perpendicular to the ABS location. In some embodiments, the angle is at least sixty degrees and not more than seventy degrees from a perpendicular to the ABS location.

Figure 9A:
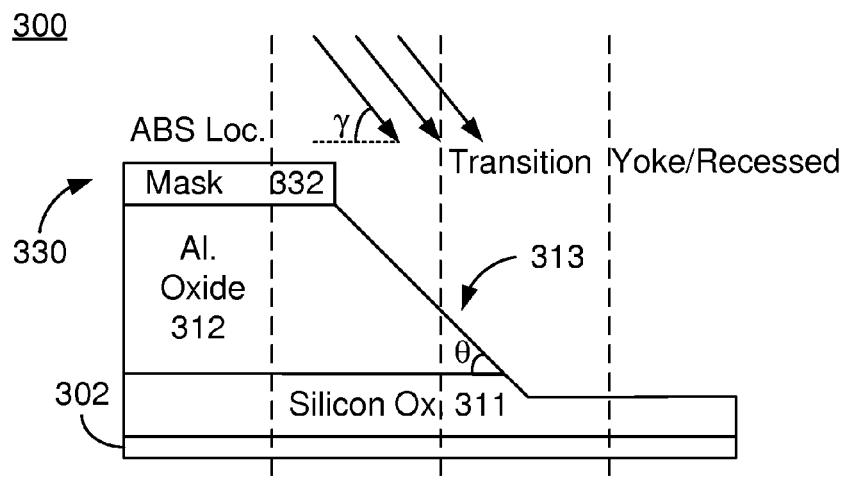
Figure 9B:
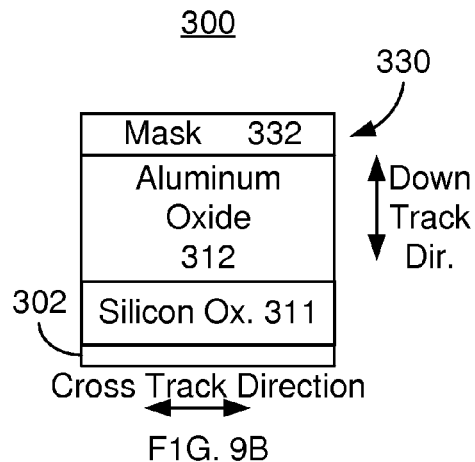
Figure 9C:
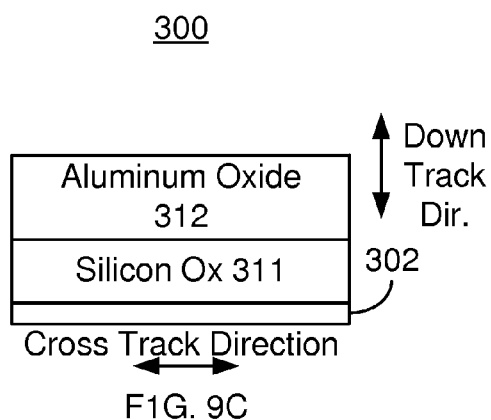
Figure 9D:
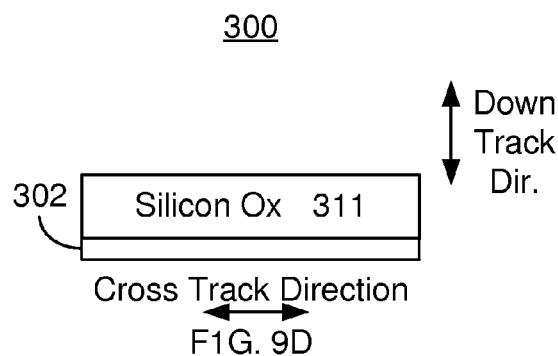

FIGS. 9A, 9B, 9C and 9D depict apex, ABS location, transition and yoke views of the magnetic recording transducer 300 after step 158 is performed. Thus, FIGS. 9B-9D depict the surfaces at the dashed lines shown in FIG. 9A. In FIG. 9A, the arrows depict the direction of the ion mill performed in step 158. The direction is indicated by the angle, γ, having the values described above. Thus, a portion of the aluminum oxide layer 312 has been removed and the rear surface 313 has been formed. The rear surface 313 is at an angle θ from a direction perpendicular to the ABS location. The angle, θ, may be at least fifty degrees and not more than eighty degrees. In some such embodiments, this angle is at least sixty degrees and not more than seventy degrees. The layer 312 has also been overmilled, ensuring the rear surface 313 is shaped as desired. Thus, a portion of the underlying silicon oxide layer 311 has been removed. The aluminum oxide layer 312 remaining forms the first sublayer for the intermediate layer.

Figure 10A:
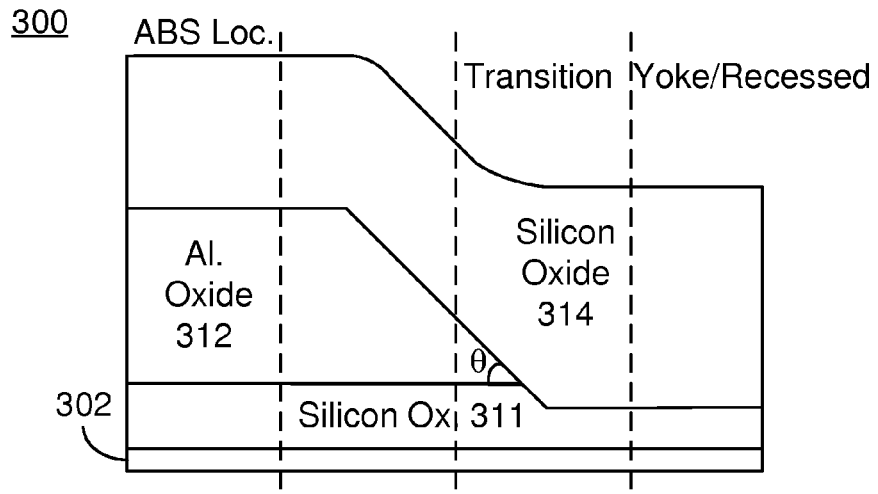
Figure 10B:
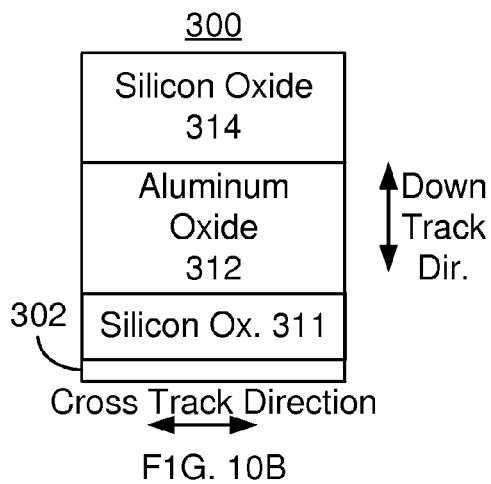
Figure 10C:
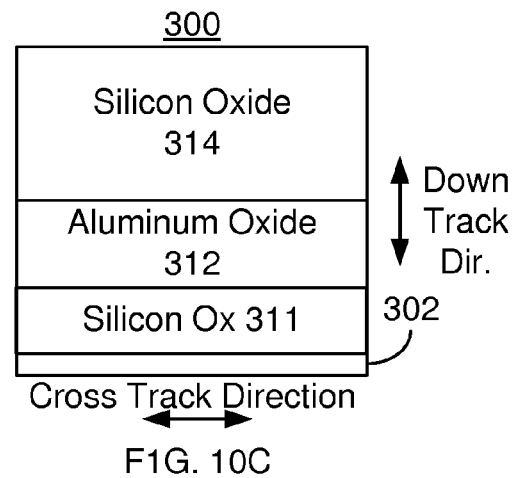
Figure 10D:
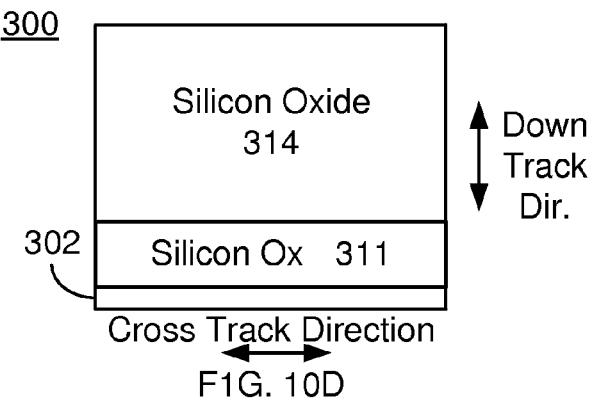

A second silicon oxide layer is deposited on the remaining aluminum oxide layer 312 and an exposed portion of the first silicon oxide layer 311, via step 160. Step 160 may also include removing a remaining portion of the mask 330. FIGS. 10A, 10B, 10C and 10D depict apex, ABS location, transition and yoke views of the magnetic recording transducer 300 after step 160 is performed. Thus, FIGS. 10B-10D depict the surfaces at the dashed lines shown in FIG. 10A. Thus, the silicon oxide layer 314 is shown. The silicon oxide layer 314 covers the aluminum oxide layer 312 and the underlying silicon oxide layer 311.

The second silicon oxide layer 314 is planarized, via step 162. Thus a portion of the second silicon oxide layer 314 is removed. In some embodiments, step 162 includes performing a chemical mechanical planarization (CMP). FIGS. 11A, 11B, 11C and 11D depict apex, ABS location, transition and yoke views of the magnetic recording transducer 300 after step 162 is performed. Thus, FIGS. 11B-11D depict the surfaces at the dashed lines shown in FIG. 11A. Because of the planarization, the top surfaces of the aluminum oxide layer 312 and the second silicon oxide layer are substantially planar. The layers 312 and 314 together from an etchable intermediate layer 310. The remaining portion of the aluminum oxide layer 312 forms the first sublayer discussed above. Similarly, the remaining portion of the silicon oxide layer 314 forms the second sublayer discussed above.

Figure 12A:
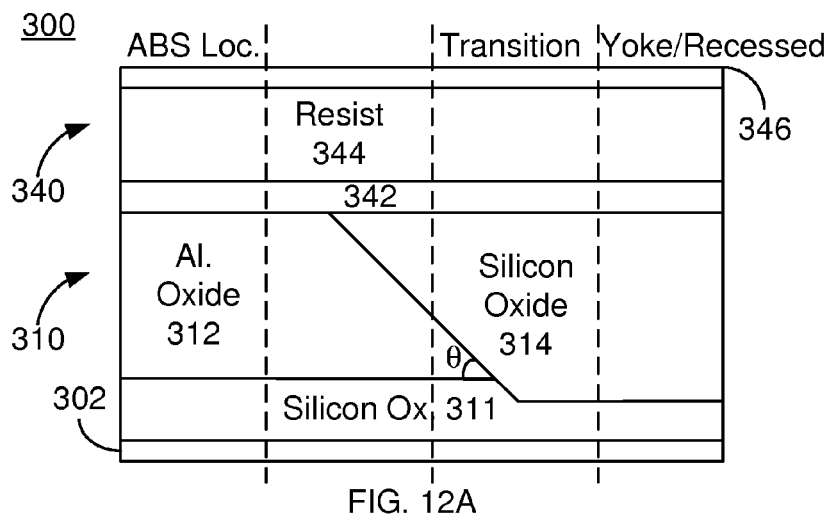
Figure 12B:
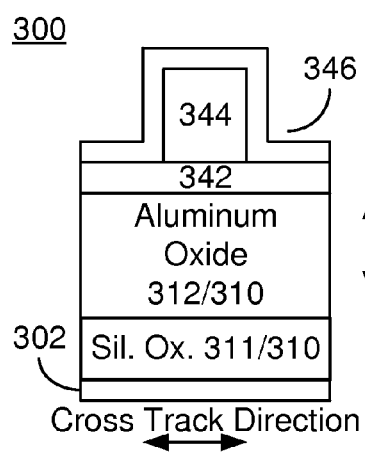
Figure 12C:
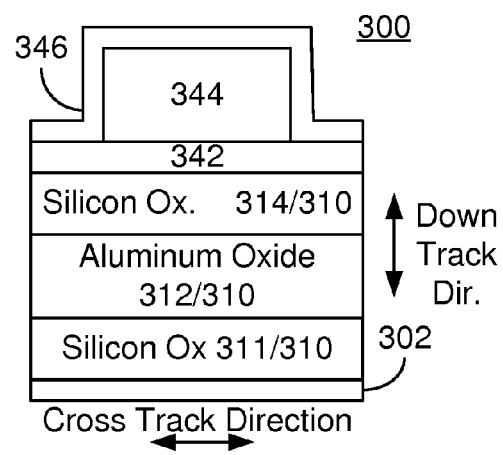
Figure 12D:
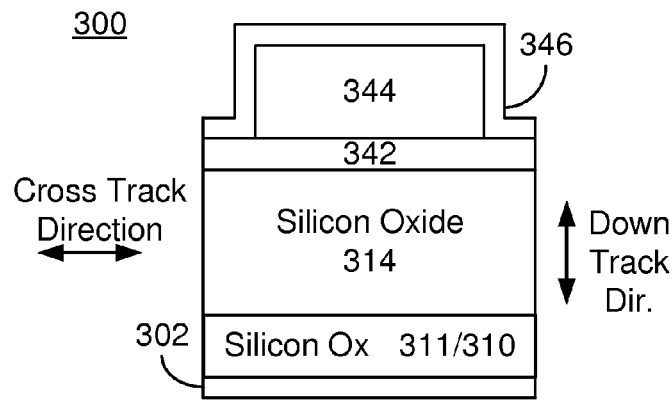
Figure 14A:
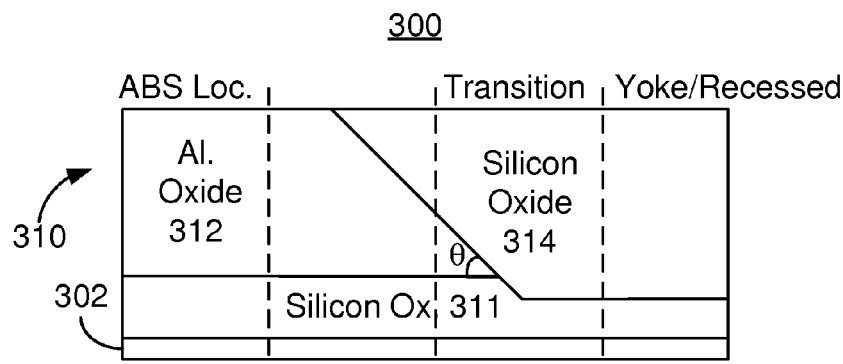
Figure 14B:
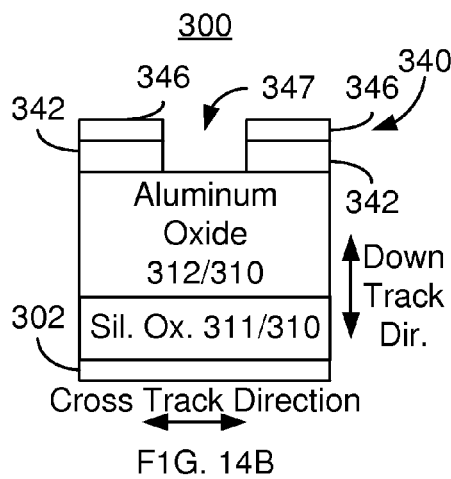
Figure 14C:
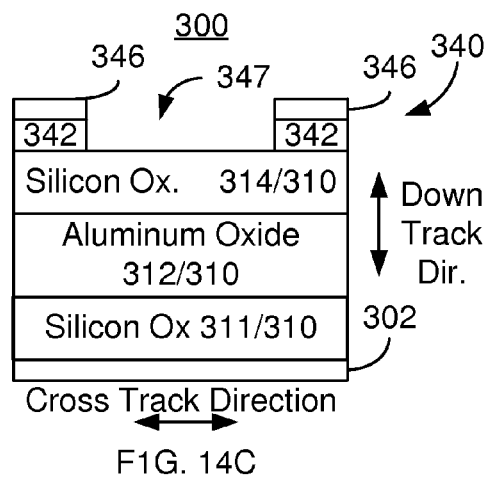
Figure 14D:
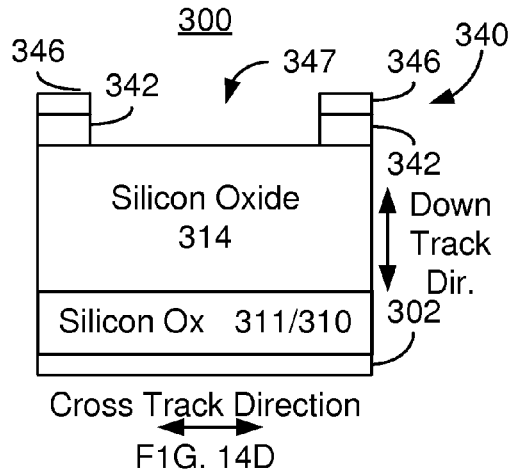
Figure 14E:
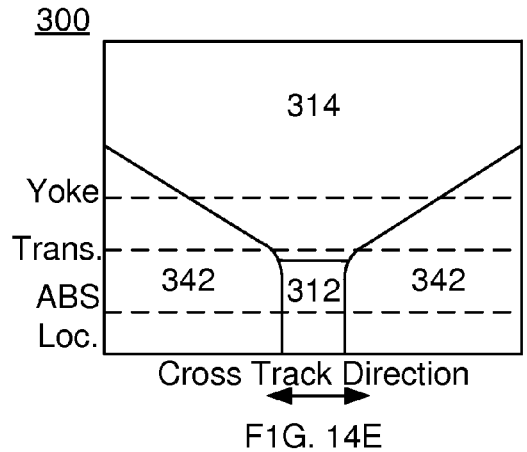

A mask for forming a trench in the intermediate layer is provided, via step 164. Step 164 generally has multiple substeps. For example, a first hard mask layer, such as Cr or Ru, may be deposited. A photoresist mask having the shape and location corresponding to the trench is formed. An additional hard mask layer, such as Ta may then be deposited. A lift-off of the photoresist is performed. As a result, the remaining Ta mask has an aperture corresponding to the aperture desired for trench formation. A portion of the underlying first mask layer is then removed, using the Ta mask as the mask. Thus, the hard mask is formed. For example, FIGS. 12A, 12B, 12C and 12D depict apex, ABS location, transition and yoke views of the magnetic recording transducer 300 after the mask layers have been deposited in step 164. FIGS. 12B-12D depict the surfaces at the dashed lines shown in FIG. 12A. Thus, a first mask layer 342, a photoresist mask 344 and a top mask layer 346 are shown. FIGS. 13A, 13B, 13C, 13D and 13E depict apex, ABS location, transition, yoke and plan views of the magnetic recording transducer 300 after the lift off of step 164 is performed. Thus, FIGS. 13B-13D depict the surfaces at the dashed lines shown in FIGS. 13A and 13E. Because the lift off has been completed, the photoresist mask 344 is no longer present. Instead, the top hard mask 346 has an aperture therein. FIGS. 14A, 14B, 14C, 14D and 14E depict apex, ABS location, transition, yoke and plan views of the magnetic recording transducer 300 after step 164 is completed. Thus, FIGS. 14B-14D depict the surfaces at the dashed lines shown in FIGS. 14A and 14E. Consequently, the mask 340 has an aperture 347 therein. The shape and location of the aperture 347 correspond to the desired footprint and location of the trench in the intermediate layer 310.

A first etch, silicon oxide, is performed, via step 166. The first etch is configured to remove the second sublayer. Stated differently, the first etch performed in step 166 may be an RIE having a chemistry appropriate for removal of silicon oxide. FIGS. 15A, 15B, 15C, 15D and 15E depict apex, ABS location, transition, yoke and plan views of the magnetic recording transducer 300 after step 166 is completed. Thus, FIGS. 15B-15D depict the surfaces at the dashed lines shown in FIGS. 15A and 15E. Thus, a portion of the silicon oxide layer 311 has been removed. As can be seen in FIGS. 15A and 15B, the aluminum oxide layer 312 may be a stop layer for such a silicon oxide etch. Thus, the aluminum oxide layer 312 is not removed in this area at and near the ABS. In contrast, in the yoke and transition regions of FIGS. 15C-15C, the silicon oxide layer 314 has been removed. In some cases, the first silicon oxide layer 311 is etched through to the etch stop layer, as shown in FIG. 15D.

Figure 16A:
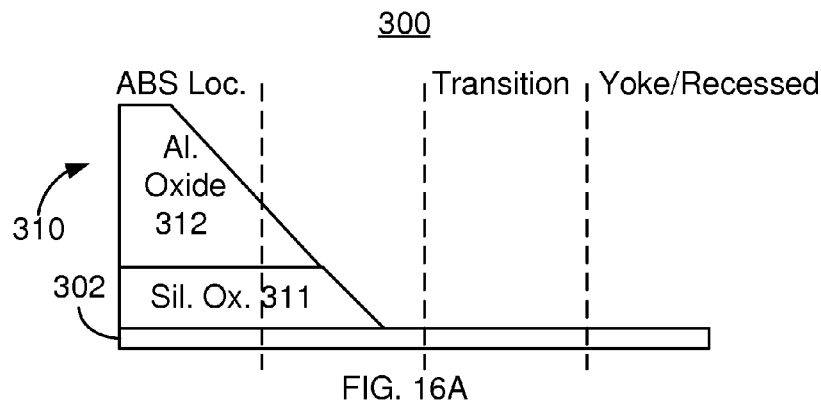
Figure 16B:
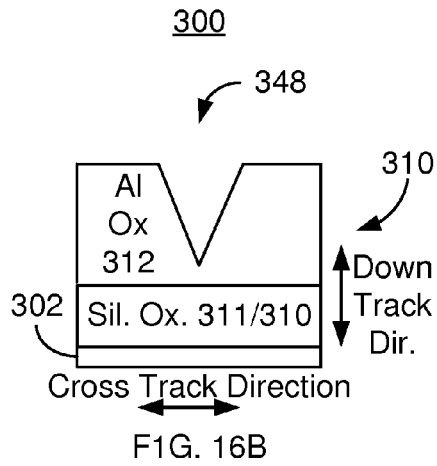
Figure 16C:
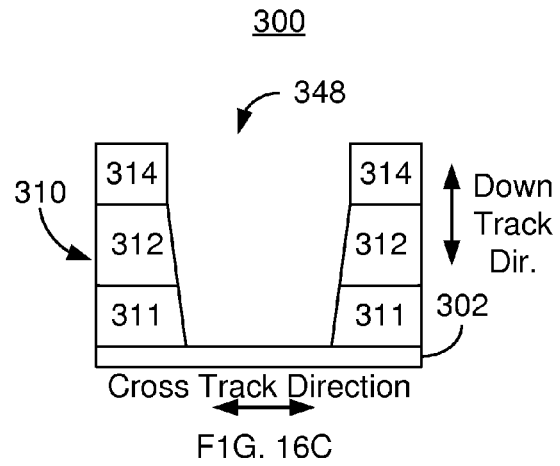
Figure 16D:
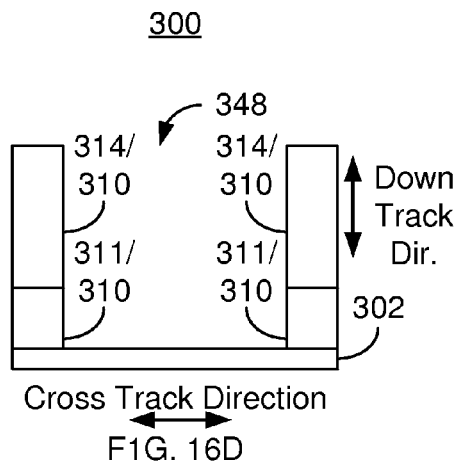
Figure 16E:
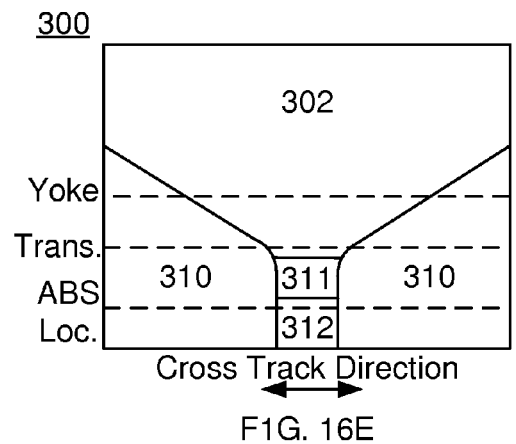

A second etch, aluminum oxide, is performed, via step 168. The second etch is configured to remove the first sublayer. Stated differently, the second etch performed in step 168 may be an RIE having a chemistry appropriate for removal of aluminum oxide. In some embodiments, the second etch is performed after the first etch. In alternate embodiments, the second etch may be performed before the first etch. FIGS. 16A, 16B, 16C, 16D and 16E depict apex, ABS location, transition, yoke and plan views of the magnetic recording transducer 300 after step 168 is completed. Thus, FIGS. 16B-16D depict the surfaces at the dashed lines shown in FIGS. 16A and 16E. Thus, a portion of the aluminum oxide layer 312 has been removed. Thus, the trench 348 has been formed by the first and second etches. The trench 348 has a bottom, a top wider than the bottom and sidewalls. The sidewalls form a first angle with a direction perpendicular to the bottom at the ABS location at the ABS location (e.g. shown in FIG. 16B). This angle is at least ten degrees and not more than twenty degrees. In some embodiments, the angle is nominally thirteen degrees. Note that in the embodiment shown in FIG. 16B, the trench 348 is triangular at the ABS location. In addition, the bottom of the trench lies within the aluminum oxide layer 312. In other embodiments, the trench 348 could have another shape, such as a trapezoid. In addition, the trench 348 could have its bottom within the layer 311. The sidewalls form a second angle with the direction perpendicular to the bottom in a portion of the second sublayer 314. This is depicted in FIG. 16D. The second angle in this region is at least zero degrees and not more than five degrees. In the embodiment shown in FIG. 16D, the sidewall angle is zero degrees, which correspond to vertical sidewalls. In the region of the rear surface of the first sublayer/aluminum oxide layer 312, the sidewall angle between the plurality of sidewalls and the surface perpendicular to the bottom varies along the rear surface of the aluminum oxide layer 312. In some embodiments, the sidewall angle varies smoothly. In some cases the variation could be linear or higher order. In other embodiments, the sidewall angle might vary in another manner.

A main pole is provided in the trench 348, via step 170. Step 170 may include depositing a nonmagnetic seed layer, such as Ru, and plating the high saturation magnetization materials for the main pole. A planarization such as a CMP may also be performed. A nonmagnetic write gap may be formed on the pole, via step 172. Trailing and/or side shields may also be formed, via step 174.

Figure 17A:
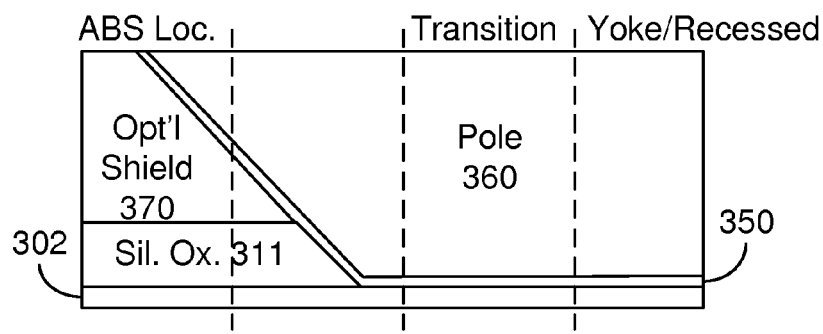
Figure 17B:
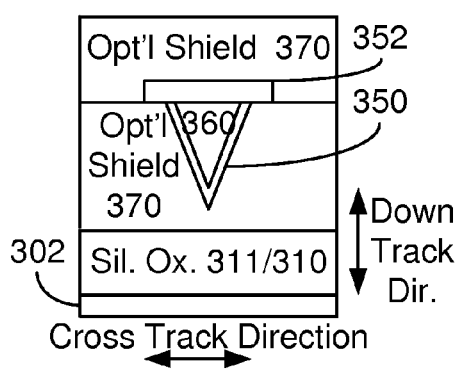
Figure 17C:
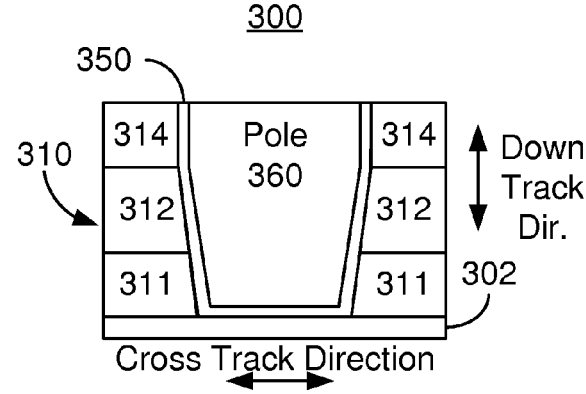
Figure 17D:
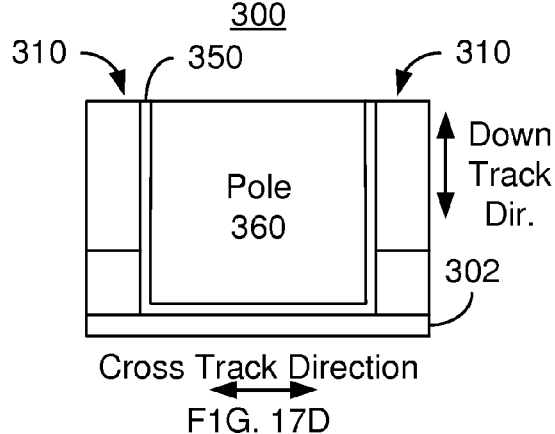

FIGS. 17A, 17B, 17C and 17D depict apex, ABS location, transition, and yoke views of the magnetic recording transducer 300 after step 172 is completed. Thus, FIGS. 17B-17D depict the surfaces at the dashed lines shown in FIG. 17A. Thus, a pole 360 having the desired geometry has been formed. Also shown are seed 350 that may form a side gap. A write gap 352 and optional shields 370 and 380 have been formed. In other embodiments, the shield 370 and/or 380 may be omitted or configured in another manner.

Using the method 150, a main pole 360 having improved performance may be fabricated. Because of the variation in the sidewall angle, the magnetic field generated by the main pole 360 and used to write to the media may be enhanced. The reverse overwrite gain may also be improved. The gradient in the magnetic field may also be improved while maintaining substantially the same side fields. As a result, adjacent track interference may not be adversely affected. Further, the pole tip region of the main pole 360 may have an increased magnetic volume. As a result, the cross track magnetic anisotropy may be improved and domain lockup issues mitigated. Thus, performance of the magnetic writer 300 may be improved. Thus, using the method 150 a transducer the desired performance may be fabricated.

We claim:

1. A method for fabricating magnetic transducer having air-bearing surface (ABS) location comprising:
   providing an intermediate including a first sublayer and a second sublayer in at least a main pole region, the first sublayer including the ABS location, the second sublayer recessed from the ABS location such that a portion of the first sublayer is between the second sublayer and the ABS location, the first sublayer having a rear surface at an angle of greater than zero degrees and less than ninety degrees from a surface perpendicular to the ABS location;
   forming a trench in the intermediate layer, the trench having a bottom, a top and a plurality of sidewalls, the plurality of sidewalls forming a first angle with a direction perpendicular to the bottom at the ABS location, the plurality of sidewalls forming a second angle with the direction perpendicular to the bottom in a portion of the second sublayer, a sidewall angle between the plurality of sidewalls and the direction perpendicular to the bottom varying along the rear surface of the first sublayer, the second angle being smaller than the first angle; and
   providing a main pole in the trench.

2. The method of claim 1 wherein the sidewall angle decreases smoothly along the rear surface of the first sublayer.

3. The method of claim 1 wherein the step of providing the intermediate layer further includes:
   full-film depositing a first nonmagnetic layer;
   removing a portion of the first nonmagnetic layer, a remaining portion of the first nonmagnetic layer forming the first sublayer having the rear surface; and
   refilling a region occupied by the portion of the first nonmagnetic layer with the second sublayer.

4. The method of claim 1 wherein the first sublayer include aluminum oxide and the second sublayer includes silicon oxide.

5. The method of claim 1 wherein the step of forming the trench further includes:
   providing a mask having an aperture therein, the aperture having a shape and location corresponding to the trench;
   performing a first etch, the first etch removing a portion of the second sublayer; and
   performing a second etch, the second etch removing at least a portion of the first sublayer.

6. The method of claim 5 wherein the first etch is performed before the second etch.

7. The method of claim 5 wherein the second etch is performed before the first etch.

8. The method of claim 1 further comprising:
   providing an underlayer under the first sublayer and the second sublayer of the intermediate layer.

9. The method of claim 8 wherein the underlayer and the second sublayer are formed of a particular material.

10. The method of claim 1 further comprising:
    providing a write gap on the main pole; and
    providing a trailing shield.

11. The method of claim 1 further comprising:
    providing at least one side shield.

12. The method of claim 1 wherein the angle between the rear surface and the surface perpendicular to ABS location is at least fifty degrees and not more than eighty degrees.

13. The method of claim 1 wherein the angle between the rear surface and the surface perpendicular to the ABS location is at least sixty degrees and not more than seventy degrees.

14. The method of claim 1 wherein the first angle is at least ten degrees and not more than twenty degrees and wherein the second angle is at least zero degrees and not more than five degrees.

15. A method for fabricating magnetic transducer having air-bearing surface (ABS) location comprising:
    depositing a first silicon oxide layer;
    depositing an aluminum oxide layer on the first silicon oxide layer;
    providing a mask covering a first portion of the aluminum oxide layer, the first portion of the aluminum oxide layer including at least part of the ABS location;
    ion milling a second portion of the aluminum oxide layer at a nonzero angle from the ABS location, a remaining portion of the aluminum oxide layer forming a first sublayer of an intermediate having a rear surface, the first sublayer including the at least the part of the ABS location, the rear surface being at an angle of at least sixty degrees and not more than seventy degrees from a surface perpendicular to the ABS location;
    depositing a second silicon oxide layer on the first sublayer and an exposed portion of the first silicon oxide layer;
    planarizing the second silicon oxide layer, a remaining portion of the second silicon oxide layer forming a second sublayer adjoining the first sublayer, at least a part of the first sublayer residing between the ABS location and the second sublayer;

providing a mask having an aperture therein, the aperture having a shape and location corresponding to a trench for a main pole;

performing a first etch, the first etch removing a portion of the second sublayer; and performing a second etch, the second etch removing at least a portion of the first sublayer, the trench being formed by the first etch and the second etch, the trench having a bottom, a top and a plurality of sidewalls, the plurality of sidewalls forming a first angle with a direction perpendicular to the bottom at the ABS location, the first angle being at least ten degrees and not more than twenty degrees, the plurality of sidewalls forming a second angle with the direction perpendicular to the bottom in a portion of the second sublayer, the second angle being at least zero degrees and not more than five degrees, a sidewall angle between the plurality of sidewalls and the bottom varying along the rear surface of the first sublayer;

providing a main pole in the trench; and providing at least one side shield.

* * * * *